United States Patent

Williams

Patent Number: 5,161,369
Date of Patent: Nov. 10, 1992

[54] AFT FAN GAS TURBINE ENGINE

[75] Inventor: Gregg G. Williams, Milford, Mich.

[73] Assignee: Williams International Corporation, Walled Lakee, Mich.

[21] Appl. No.: 646,253

[22] Filed: Jan. 28, 1991

[51] Int. Cl.⁵ .............................................. F02K 3/02
[52] U.S. Cl. ................................ 60/226.1; 60/39.142; 244/135 R
[58] Field of Search .......................... 60/226.1, 39.142; 244/135 R

[56] References Cited

U.S. PATENT DOCUMENTS

| | | | |
|---|---|---|---|
| 2,644,298 | 7/1953 | McLeod | 60/226.1 |
| 2,943,815 | 7/1960 | Besson | 244/135 R |
| 3,332,242 | 7/1967 | Johnson | 60/226.1 |

Primary Examiner—Richard A. Bertsch
Assistant Examiner—Howard R. Richman
Attorney, Agent, or Firm—Lyon & Delevie

[57] ABSTRACT

An aft fan gas turbine engine comprises a coaxially related compressor, compressor turbine, fan turbine, and aft fan. An annular fuel tank is disposed about the compressor and an annular combustion chamber is disposed between the compressor and turbine.

2 Claims, 4 Drawing Sheets

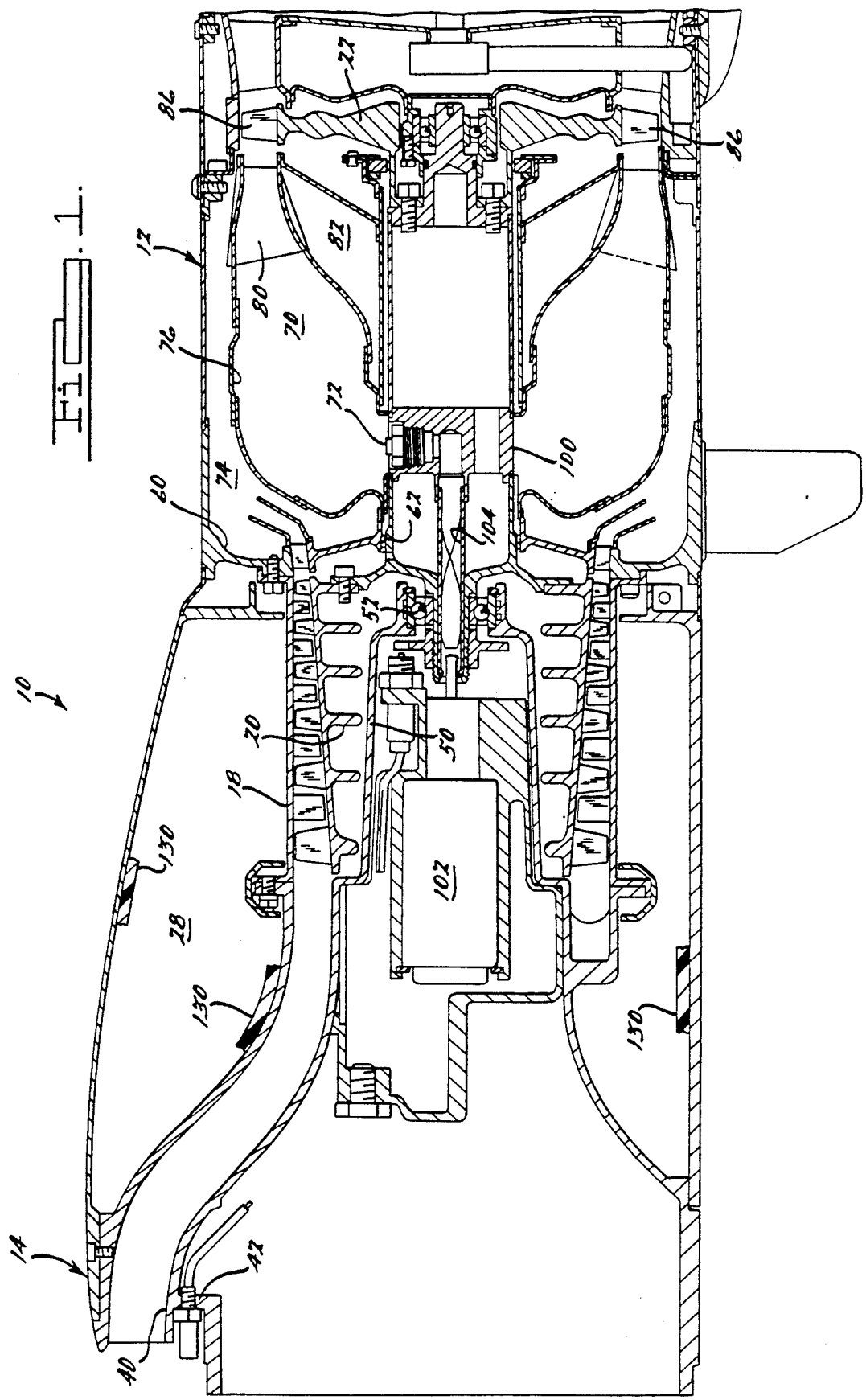

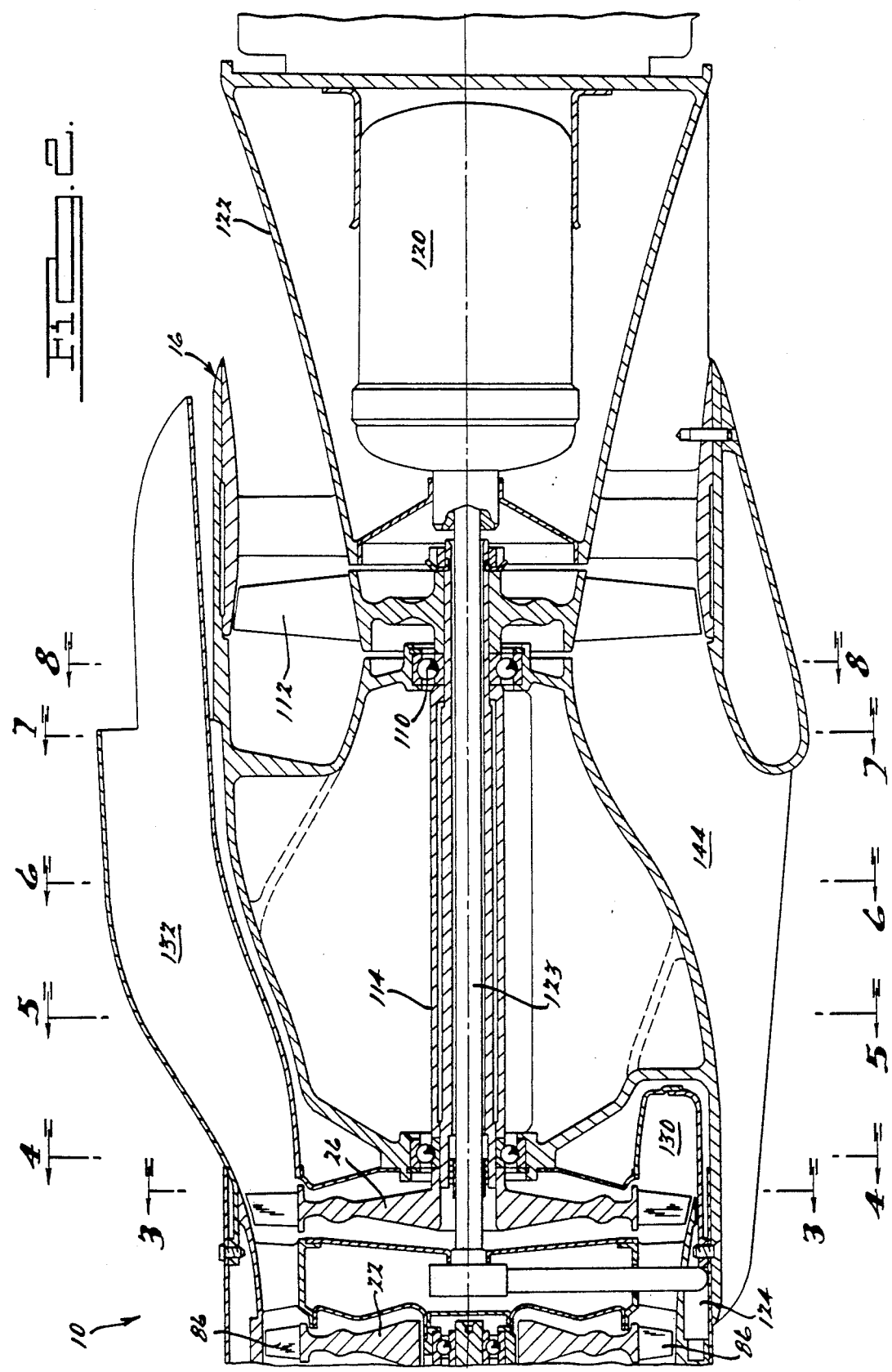

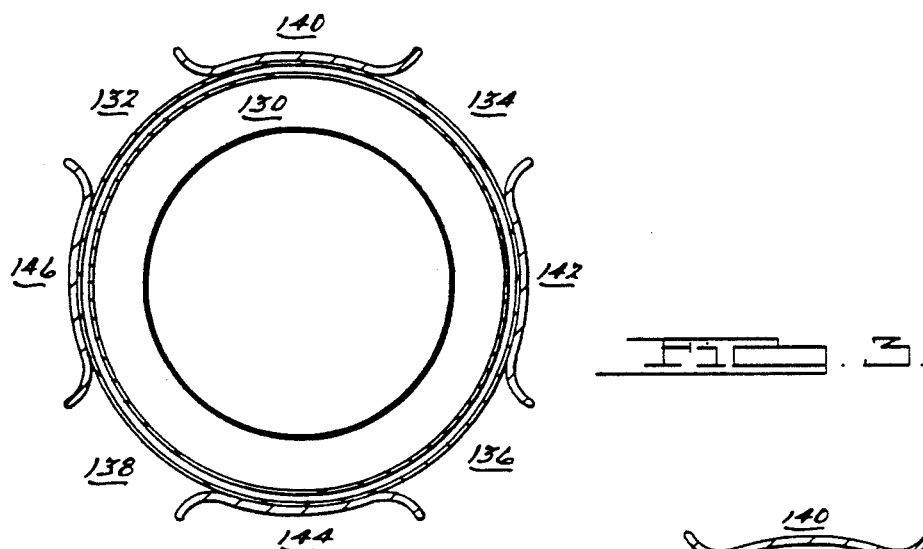
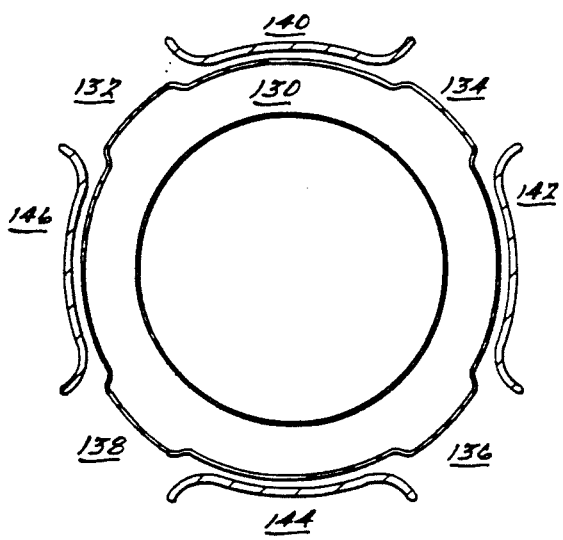
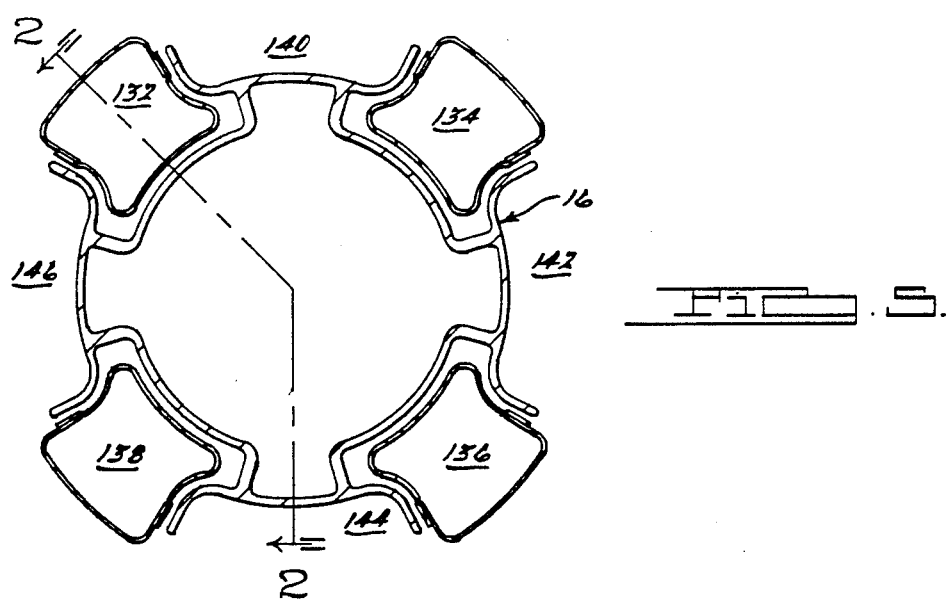

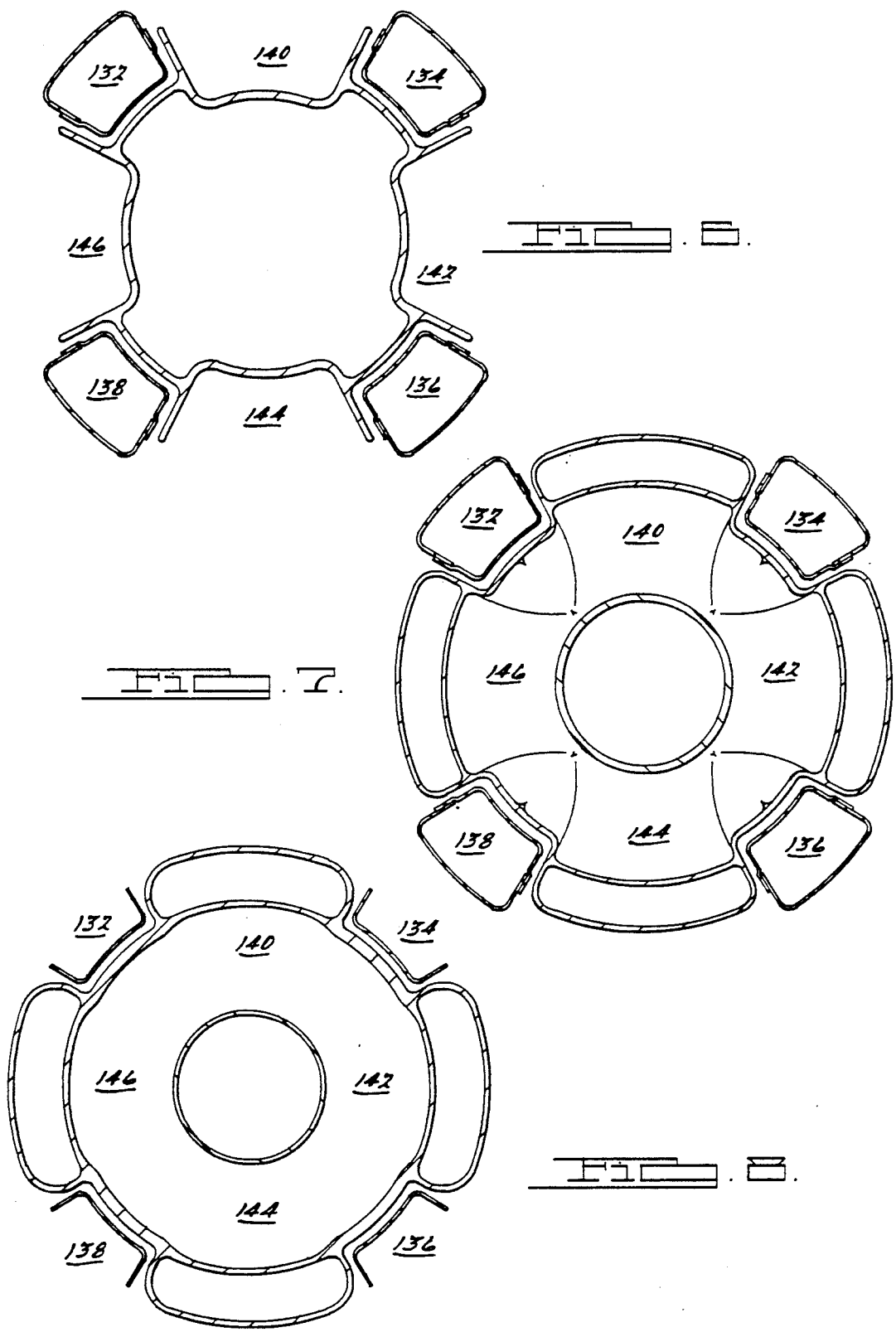

AFT FAN GAS TURBINE ENGINE

BACKGROUNDS OF THE INVENTION

This application relates to an improvement of the engine disclosed in application Ser. No. 628,108, filed Dec. 14, 1990, for Integrated Propulsion System, assigned to the assignee of this application. The invention relates to an integrated, aft fan, gas turbine engine.

Gas turbine engines require a number of support systems in order to render the engine operational. Such systems comprise, for example, intake, exhaust, fuel supply, electrical, cooling, lubrication, mounting, starting, and control systems. The associated systems are typically mounted externally of the engine, or installed within the vehicle and connected to the engine by means of ducts, tubing, hooses, wires, harnesses, etc. Interfaces between the engine and its associated components become increasingly complex as the number of associated systems increases.

Another problem is presented where the propulsion system comprises the load transfer mechanism between therefore and aft sections of an aircraft. When this air frame configuration is used, the propulsion system must be capable of withstanding loads experienced during aircraft maneuvers, e.g. vehicle roll, pitch and yaw.

Yet another problem is presented when static thrust requirements dictate the use of a fan. The aforesaid problems are accentuated when airframe constraints dictate that the fan be orientated coaxilly and aft of the compressor and power turbine.

SUMMARY OF THE INVENTION

The aft fan gas turbine engine and its associated support systems of the invention are structurally integrated, greatly simplifying component interface and installation problems. The engine includes a forward assembly comprising an annular integral fuel tank, air inlet, fuel pump, front compressor rotor bearing support, and compressor rotor and stator. An intermediate assembly comprises a combustor, turbine nozzle and turbine. The rear assembly comprises a rear spool, fan, turbine rotor bearing support, turbine exhaust ducts, fan air intake, and starting system. Self-lubricated bearings are used eliminating the need for an external lubrication system. In the disclosed embodiment o the invention, a pyrotechnics starter and igniters provide one-shot operation. External air crank and ignition or a conventional stater and start procedure can be used for multiple starts, if desired.

BRIEF DESCRIPTION OF THE DRAWINGS

FIGS. 1 and 2 comprise a composite cross-sectional elevation of an integrated propulsion system constructed in accordance with the instant invention.

FIG. 3 is a view taken along the line 3—3 of FIG. 2.
FIG. 4 is a view taken along the line 4—4 of FIG. 2.
FIG. 5 is a view taken along the line 5—5 of FIG. 2.
FIG. 6 is a view taken along the line 6—6 of FIG. 2.
FIG. 7 is a view taken along the line 7—7 of FIG. 2.
FIG. 8 is a view taken along the line 8—8 of FIG. 2.

DETAILED DESCRIPTION OF THE REFERRED EMBODIMENT OF THE INVENTION

Referring to FIGS. 1 and 2 a propulsion system 10 constructed in accordance with a preferred embodiment o the instant invention, comprises a generally cylindrical structurally integrated assembly to which al of the components of the system are either attached, contained internally, or formed integrally therewith.

The major structural components o the system 10 comprise an intermediate combustor housing 12, forward air inlet housing 1,4 and an aft fan housing 16. A compressor stator 18 is housed internally of the inlet housing 14 as is a complementary compressor rotor 20. A turbine rotor 22 to drive the compressor is disposed at the aft end of the intermediate combustor housing 12, an a fan turbine rotor 26 is disposed at the forward end of the aft housing 16. A fuel tank 28 of annular configuration envelopes the compressor stator 18, the outer wall of which is defined by the forward air inlet housing 14.

More specifically, the configuration of the inlet housing 14 is of Pitot scoop design. In a constructed embodiment, an inlet scoop 40 is provided with a small standoff 42 that functions as a boundary-layer diverter.

A front bearing support 50 is integral with the air inlet housing 14 for the support of a front bearing 52 which journals the compressor rotor 20.

The compressor stator 18 and rotor 20 comprise one-piece castings that are cast to near net-shape with machining limited to mounting surfaces and stator and rotor vane tips.

The aft end of the compressor stator 18 is supported by a radially extending bulkhead 60 that also supports a rotor shaft seal 62.

An annular, axial flow combustor 70 is fueled by three shaft-mounted/shaft-fed rotatable fuel injectors 72 (one of which is shown). Combustion and cooling air from the compressor 20 passes through an annular chamber 74 that is defined in part by an outer wall 76 of the combustor 70, and in part by the intermediate combustor housing 12. Air is fed from the chamber 74 to the combustor 70 through a plurality of hollow vanes 80 that extend between the passage 74 and the interior o a combustor plenum 82.

The annular, axial flow combustor 70 has a generally toroidal primary combustion zone with a single vortex primary recirculation pattern, promoting quick starting, efficient combustion, and good stability over a wide range of operating conditions. The primary combustion zone discharges directly aft past the vanes 80 to impinge upon the blades 86 of the turbine rotor 22. The annular combustor 70 is an assembly of stainless steel sheet material elements that are stamped, formed, welded and riveted to form a structurally integrated assembly.

The combustor 70 is fueled by a rottable nozzle assembly comprising the nozzles 72 which are supported by an engine shaft 100 that is driven directly by the turbine rotor 22. Fuel is introduced a the forward end o the shaft 100 and flows rearwardly from a fuel pump 102 through a fuel delivery tube 104 to the nozzles 72 thereafter to be atomized by centrifugal force.

The combustor assembly 70 is defined in part by the plurality of hollow vanes 80 that carry compressed air radially inwardly whereupon the air flows forwardly and radially outwardly to provide air to the combustion zone o the combustor 70. Air flow through the vanes 80 effects cooling thereof permitting the engine to operate at turbine inlet temperatures in excess of 2100° F.

The fan housing 16 serves as a support for the fan turbines 26 as well as a rear bearing 110 and fan 112. The fan 112 is driven directly by he fan turbine 26 through a shaft 114.

A pyrotechnics propellant canister 120 is disposed internally of a fan exhaust shroud 122. The propellant in the canister 120 is activated by an external electrically signal and discharges gas through a tube 123 disposed coaxilly and internally of the fan shaft 114. Gas flows to nozzles 124 thence against the vanes of the turbine rotor 22. Thus, gases generated by the propellant generator 120 spin the turbine rotor 22, shaft 100, and compressor rotor 20 by impinging on the turbine blades 86 of the turbine rotor 22. Resultant rotation of the compressor 20 provides enough air and fuel flow through the engine 10 to support ignition whereupon a conventional igniter (not shown) sprays, for example, a magnesium/teflon fueled flame into the combustor 70 to effect ignition. It will be appreciated at the on-board start system may be replaced, if desired, with a remote hot gas generator, the output of which is du ted into impingement upon the turbine rotor blades 86. Alternatively, compressed air from a remote air compressor may be utilized to start the engine 10, or the engine may be stated by windmilling if launched at a high relatively high light speed.

The annular space radially outwardly of the compressor startor 18 and the inlet housing 14 defines the fuel tank 28 which has and annular, collapsible fuel bladder 130 therein. The fuel tank 28 may be pressurized internally or externally of the bladder thereof by utilizing bleed air from the engine compressor. Internal fuel pressure may be relieved by a conventional pressure-relief valve (not shown) thereby to provide regulated fuel pressure that insures controlled fuel flow from he tank 28. Tank pressurization during the stat sequence may also be obtained by bleeding gas from the start cartridge 120 to externally pressurize the bladder 130.

As best seen in FIGS. 3 through 8 of the drawings, combustion gas pass through the compressor and fan turbines 22 and 26, respectively, thence through an annulus 130 to a plurality of exhaust ducts 132, 134, 136 and 138. The circumferentially spaced array of exhaust ducts 132 through 138 accommodates a like plurality of intermediately spaced air inlet ducts 140, 142, 144 and 146. The aforesaid air and exhaust ducts are supported in a circumferential array by the aft housing 16 which, in conjunction with the fan air shroud 122 disposed about the start canister 120, provides for efficient exhaust and fan air flow aft of the compressor and fan turbines 22 and 26, respectively, while minimizing the frontal cross-section of the engine 10.

In the fun condition, fuel flow is from the tank 28 through the fuel control and pump 102 through the fuel feed tube 104 to the injectors 72. Fuel is distributed to each of the injectors 72 which spray the fuel radially outwardly into the combustion zone of the combustor 70.

Gases produced in the combustor flow aft past the vanes 80 and through the turbine rotor 22, thence through the fan turbine 26 and outwardly through the exhaust ducts 132 through 138. Fan air is inducted through the ducts 140 through 146 and flow aft through the fan rotor 112 to exit around the shroud 122.

While the preferred embodiment of the invention has been disclosed, it should be appreciated that the invention is susceptible of modification without departing from the scope of the following claims.

I claim:
1. An aft fan gas turbine engine comprising
a frontal housing having a generally circular air intake;
an axial flow compressor coaxilly aligned with said air intake in fluid flow communication therewith;
an annular combustor coaxilly aligned with said compressor and communicating with the outlet end thereof;
an annular fuel cell coaxilly related and radially aligned with said compressor;
a compressor turbine shaft disposed internally of and coaxilly aligned with said combustor;
a compressor turbine on said compressor turbine shaft for driving said compressor;
a fan turbine shaft coaxilly aligned with and disposed aft of said compressor turbine shaft;
a fan turbine on the front end of said fan turbine shaft communicating with said compressor turbine;
a fan mounted on a fan shaft extending coaxilly with said fan turbine shaft and driven by said fan turbine on the aft end of said fan turbine shaft;
a plurality of exhaust ducts orientated in a circumferential spaced array about said fan shaft for conducting exhaust from said fan turbine longitudinally of said engine; and
a plurality of fan air intake ducts orientated in a circumferentially spaced array between said exhaust ducts, respectively.
2. The engine of claim 1 wherein a start canister is disposed axially rearwardly of said fan.

* * * * *